United States Patent
Jang et al.

(10) Patent No.: US 7,697,473 B2
(45) Date of Patent: Apr. 13, 2010

(54) EMULATION DEVICE AND METHOD FOR SUPPORTING IPV6 IN WIBRO TERMINAL

(75) Inventors: Hee-Jin Jang, Yongin-si (KR); Jin-Hyeock Choi, Suwon-si (KR); Youn-Hee Han, Guri-si (KR)

(73) Assignee: Samsung Electronics Co., Ltd. (KR)

( * ) Notice: Subject to any disclaimer, the term of this patent is extended or adjusted under 35 U.S.C. 154(b) by 525 days.

(21) Appl. No.: 11/498,820

(22) Filed: Aug. 4, 2006

(65) Prior Publication Data
US 2007/0153810 A1 Jul. 5, 2007

(30) Foreign Application Priority Data
Jan. 4, 2006 (KR) .................. 10-2006-0000944

(51) Int. Cl.
H04W 4/00 (2009.01)
H04L 12/28 (2006.01)
H04L 12/56 (2006.01)
H04J 3/16 (2006.01)
G06F 15/173 (2006.01)
G06F 15/16 (2006.01)

(52) U.S. Cl. .............. 370/328; 370/392; 370/395.5; 370/466; 709/238; 709/245; 709/246

(58) Field of Classification Search ............ 370/395.53
See application file for complete search history.

(56) References Cited

U.S. PATENT DOCUMENTS

| | | | |
|---|---|---|---|
| 6,873,627 B1 * | 3/2005 | Miller et al. ............ | 370/466 |
| 6,957,277 B2 * | 10/2005 | Yagyu et al. ............ | 709/245 |
| 6,959,009 B2 * | 10/2005 | Asokan et al. ........... | 370/475 |
| 7,339,895 B2 * | 3/2008 | Ozaki et al. ............ | 370/252 |
| 2004/0221042 A1 * | 11/2004 | Meier .................. | 709/227 |
| 2006/0198394 A1 * | 9/2006 | Gotoh et al. ............ | 370/469 |
| 2007/0274232 A1 * | 11/2007 | Axelsson et al. ......... | 370/254 |

OTHER PUBLICATIONS

T. Narten et al., RFC-2461: Neighbor Discovery for IP Version 6, The Internet Society, Dec. 1998, pp. 37-70.*
IEEE, IEEE Std 802.16-2004, Oct. 2004, pp. 1-41.*
S. Madanapalli, IPv6 Neighbor Discovery over 802.16: Problems and Goals, The Internet Society, Nov. 2005, pp. 1-14.*

(Continued)

Primary Examiner—Daniel J Ryman
Assistant Examiner—Cassandra Decker
(74) Attorney, Agent, or Firm—NSIP Law

(57) ABSTRACT

A network emulation device and method in a terminal of an IEEE 802.16 communication system supporting IPv6 communications based on a Neighbor Discovery (ND) protocol are provided. The terminal includes an IPv6 module for performing an ND mechanism to search for a neighbor terminal or a router, a MAC module for communicating based on the IEE 802.16 standard, and a network emulation module provided between the IPv6 module and the MAC module for analyzing a ND message received from the IPv6 module and discarding the ND message or generating a response message for the ND message according to the message type. The network emulation module converts a broadcast ND message to a unicast message and provides the unicast message to a corresponding network device if network information needed to internally generate the response message is not collected.

8 Claims, 5 Drawing Sheets

OTHER PUBLICATIONS

Considerations of Neighbor Discovery Protocol over IEEE 802.16 Networks', Joo-Chul Lee; Youn-Hee Han; Myung-Ki Shin; Hee-Jin Hyoung-Jun Kim; Advanced Communication Technology, 2006. ICACT 2006. The 8$^{th}$ International Conference vol. 2, Feb. 20-22, 2006; pp. 951-955.

'IPv6 Neighbor Discovery Protocol for Common Prefix Allocation in IEEE 802.16', Hongseok Jeon; Junghoon Jee; Advanced Communication Technology, 2006. ICACT 2006. The 8$^{th}$ International Conference, vol. 3, Feb. 20-22, 2006; pp. 166-1663.

Shin, M., 'Scenarios and Considerations of IPv6 in IEEE 802.16 Networks', inernet draft; draft-shin-ipv6-ieee802.16-01 (Oct. 2005).

\* cited by examiner

EMULATION DEVICE AND METHOD FOR SUPPORTING IPV6 IN WIBRO TERMINAL

CROSS-REFERENCE TO RELATED PATENT APPLICATIONS

This application claims the benefit under 35 U.S.C. §119 (a) of a Korean Patent Application filed in the Korean Intellectual Property Office on Jan. 4, 2006 and assigned Serial No. 2006-00944, the entire disclosure of which is hereby incorporated by reference.

BACKGROUND OF THE INVENTION

1. Field of the Invention

The present invention relates generally to a wireless communication system. More particularly, the present invention relates to an emulation device and method for supporting Internet Protocol version 6 (IPv6) over an Institute of Electrical and Electronics Engineers (IEEE) 802.16/Wireless Broadband (WiBro) communication network.

2. Description of the Related Art

A broadband wireless communication network technology known as World Interoperability for Microwave Access (WiMax) has recently been adopted as the IEEE 802.16 standard by the IEEE, and a version of WiMax for mobile access, WiBro has been also adopted as IEEE 802.16e. Hence, commercial deployment of portable Internet communication services based on these standards has accelerated.

However, since the IEEE 802.16/802.16e standards are different from the existing radio access technologies including IEEE 802.11x or 3G, IPv4 or IPv6 cannot be directly applied to an IEEE 802.11 network.

For IPv6, a Neighbor Discovery (ND) protocol providing broadcast or multicast message exchanges in the processes of address resolution, router discovery, duplicate address detection, and auto configuration, which are performed by broadcast or multicast, is a requisite to a terminal. However, the IEEE 802.16 network is a point-to-multipoint network and the terminal cannot broadcast or multicast. Therefore, the ND protocol of IPv6 cannot work well.

Accordingly, there is a need for an improved emulation device and method that supports Internet Protocol version 6 (IPv6).

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an emulation device and terminal for implementing a Neighbor Discovery (ND) protocol of IPv6, while avoiding collision between an IPv6 layer and an IEEE 802.16 Medium Access Control (MAC) layer.

Certain exemplary embodiments of the present invention provide an emulation device and method for preventing collision between the ND mechanism of IPv6 and an IEEE 802.16 MAC layer which does not support broadcasting/multicasting of a terminal by adding a network emulation layer between an IPv6 layer and a MAC layer in the terminal and feeding back the IP address of a router collected by a MAC management message to the IP layer.

Certain exemplary embodiments of the present invention provide an emulation device and method for reducing resource consumption by a broadcasting message in the ND mechanism of IPv6 by generating the IPv6 address of the terminal based on router information included in a MAC management message received from a Base Station (BS).

According to one aspect of exemplary embodiments of the present invention, a terminal, in an IEEE 802.16 communication system supporting IPv6 communications based on a neighbor discovery protocol, includes an IPv6 module for generating a multicast ND message to search for a neighbor terminal or a router, and a MAC module for exchanging MAC management messages with a base station for IPv6 communications, a network emulation device is provided between the IPv6 module and the MAC module. The network emulation device collects network information from a MAC management message received from the base station, generates a response message for the multicast ND message based on the network information, and provides the response message to the IPv6 module, or discards the ND message, or converts the ND message to a unicast message.

According to another aspect of exemplary embodiments of the present invention, in a network emulation method in a terminal in an IEEE 802.16 communication system supporting IPv6 communications based on a neighbor discovery protocol, the terminal comprises an IPv6 module for generating a multicast ND message to search for a neighbor terminal or a router, a MAC module exchanges MAC management messages with a base station for IPv6 communications, a network emulation layer between the IPv6 module and the MAC module, for supporting the neighbor discovery protocol, collects network information from a MAC management message received, and the neighbor discovery protocol is emulated based on the network information.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1A:
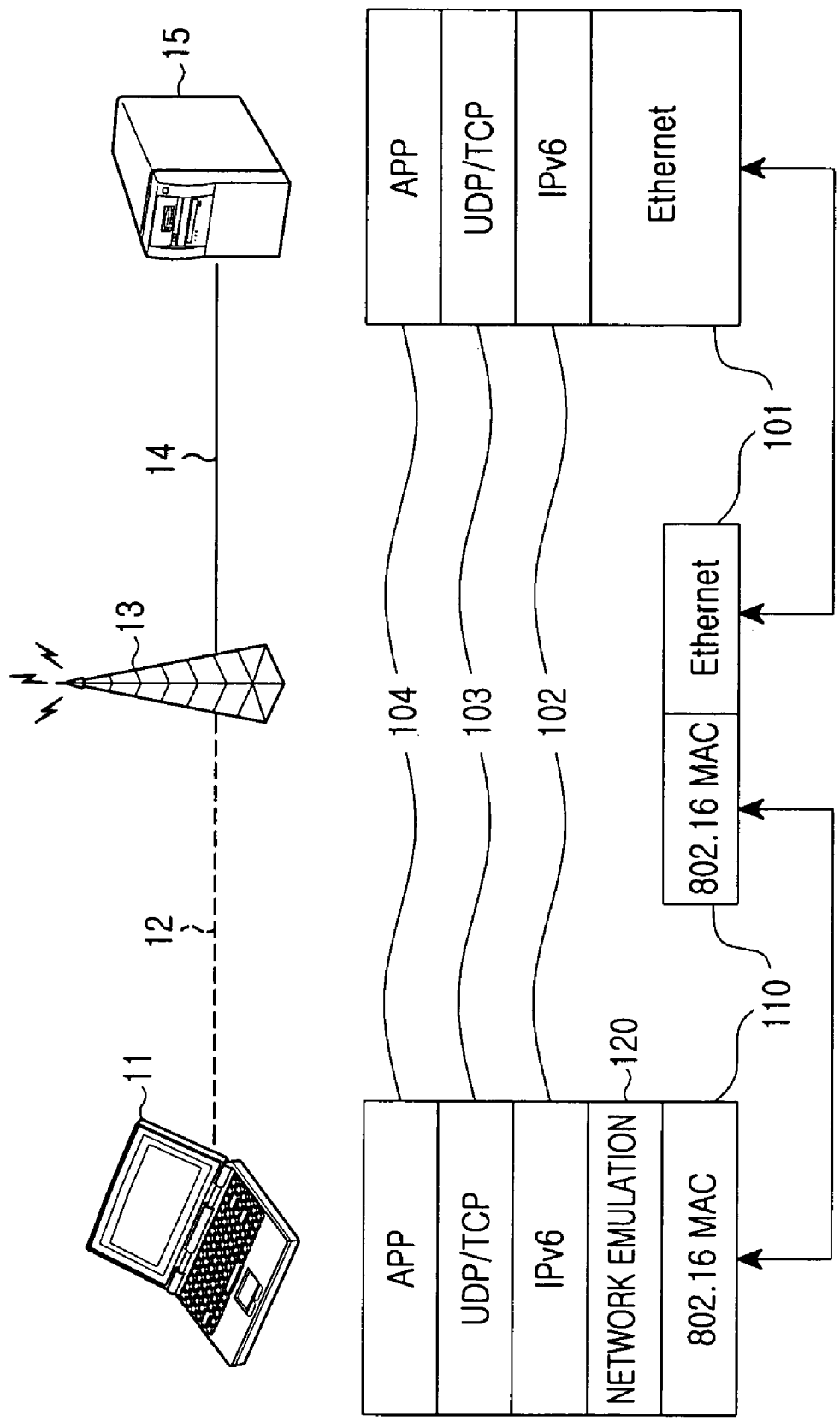
FIG. 1A illustrates the configuration of an IEEE 802.16 network to which an IPv6 network emulation device and method according to an exemplary embodiment of the present invention are applied.

FIG. 1A illustrates a configuration of an IEEE 802.16 network to which an IPv6 network emulation device and method according to an exemplary embodiment of the present invention are applied.

Referring to FIG. 1A, a wireless terminal 11 is connected to a base station (BS) 13 by a radio link 12 and the BS 13 is connected to a router 15 within an IPv6 network by a wired link 14. The BS 13 converts an Ethernet frame received from a destination terminal (not shown) via the router 15 to an IEEE 802.16 frame and provides the IEEE 802.16 frame to the terminal 11. The BS 13 also converts an IEEE 802.16 frame received from the terminal 11 to an Ethernet frame and provides the Ethernet frame to the destination terminal via the router 15.

The router 15 includes a protocol stack with an Ethernet layer 101, IP layer 102, UDP/TCP layer 103, and an application layer 104. The terminal 11 operates based on a protocol stack with an IEEE 802.16 MAC layer 110, network emulation layer 120, the IP layer 102, UDP/TCP layer 103, and application layer 104. The BS 13 has a protocol stack of the IEEE 802.16 MAC layer 110 and the Ethernet layer 101.

While IEEE 802.16 and Ethernet are defined in the MAC layer of the BS 13, to which the present invention is not limited, the BS 13 supports conversion between headers of most MAC layer protocols.

The terminal 11 and the BS 13 exchange MAC Protocol Data Units (PDUs) in the MAC layers. A MAC PDU includes a fixed-length MAC header, variable-length payload, and an optional Cyclic Redundancy Check (CRC). The MAC PDU may have a generic header or a bandwidth request header depending on the value of a Header Type (HT) field. A MAC PDU contains a MAC management message or higher-layer data, if it is not a bandwidth request MAC PDU without payload.

The ND protocol is defined in the IPv6 layer, which addresses address resolution, router discovery, and neighbor unreachability detection. The ND protocol detects the existence of neighbor terminals, exchanges a Neighbor Solicitation (NS) message and a Neighbor Advertisement (NA) message to determine the link layer addresses of the neighbors, and detects routers and maintains the reliability of a route by use of a Router Solicitation (RS) message and a Router advertisement (RA) message.

Figure 1B:
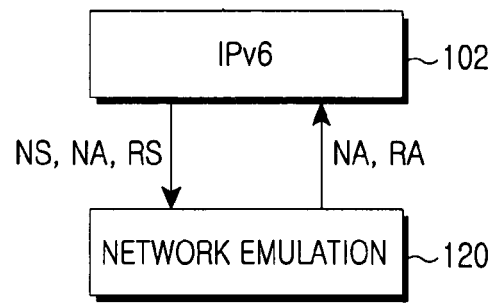
FIG. 1B is a block diagram of an IPv6 layer and a network emulation layer illustrated in FIG. 1A, for describing interaction between the layers.

FIG. 1B is a block diagram of the IPv6 layer 102 and the network emulation layer 120 illustrated in FIG. 1A, for describing interaction between the layers.

Referring to FIG. 1B, for IP communications from the terminal 11, the IPv6 layer 102 sends an NS, NA or RS message, and the network emulation layer 120 analyzes an IPv6 packet received from the IPv6 layer 102 to decide whether the IPv6 packet includes the NS, NA or RS message. In the presence of the NS, NA or RS message in the IPv6 packet, the network emulation layer 120 provides an NA or RA message as a response for the NS, NA or RS message to the IPv6 layer 102, rather than send the NA or RA through the MAC layer 110. The response message is generated based on the IP information of a router collected by a MAC management message such as Request-Response (REG-RSP) received from the BS during registration for IP communications.

Figure 2:
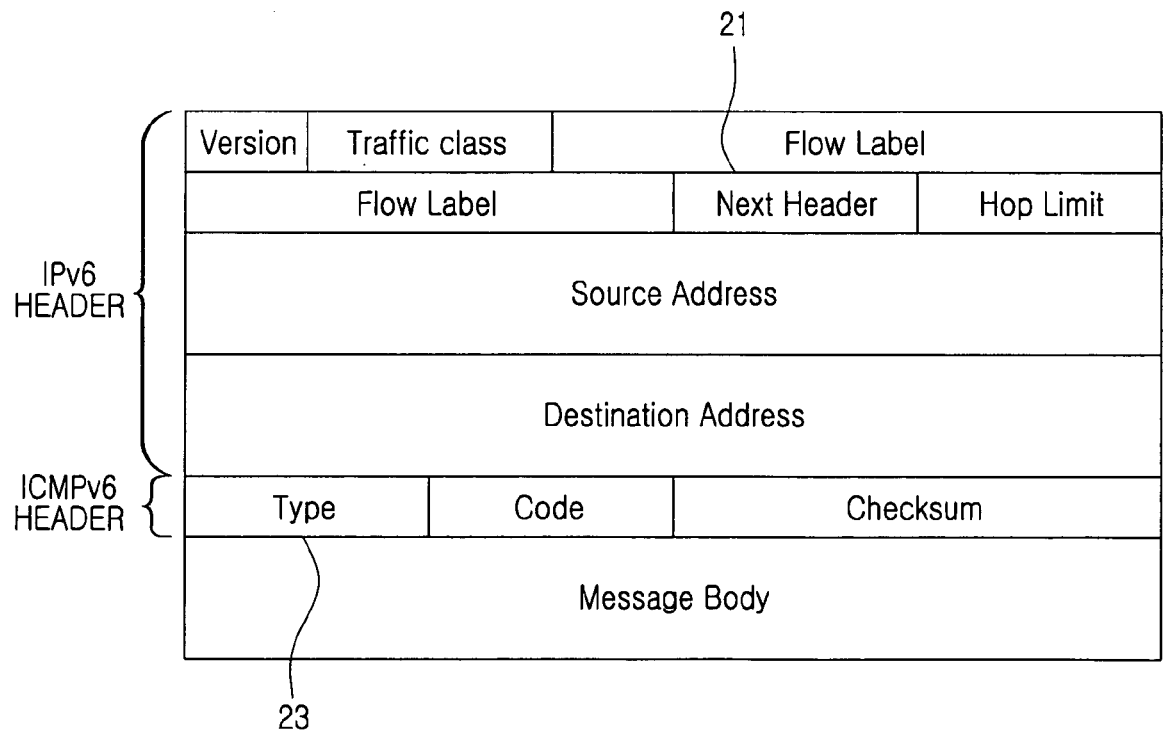
FIG. 2 illustrates the format of an IPv6 packet.

FIG. 2 illustrates the format of an IPv6 packet. Referring to FIG. 2, the network emulation layer 120 of the terminal 11 determines that transmission data in payload is an Internet Control Message Protocol for IPv6 (ICMPv6) data if a next header field 21 in an IPv6 header is 58, and analyzes an ICMPv6 header of the ICMPv6 payload. If a type field of the ICMPv6 header is 133 (Router Solicitation), 135 (Neighbor Solicitation) or 136 (Neighbor Advertisement), the network emulation layer 120 generates an NA or RA message, considering that the packet contains an RS, NS or NA message.

For generation of the response message, the network emulation layer 120 extracts and stores the network information of the terminal 11 from a MAC management message received from the BS 13. Since the BS 13 is connected to the router 15 by an Ethernet link, the BS 13 can obtain the network information of the router 15 by exchanging MAC messages with the router 15.

To obtain the network information from the BS 13, the terminal 11 exchanges MAC management messages such as (REG-REQ) and REG-RSP with the BS 13. The network emulation layer 120 extracts the network information from the received MAC management message and stores/updates the network information.

Figure 3:
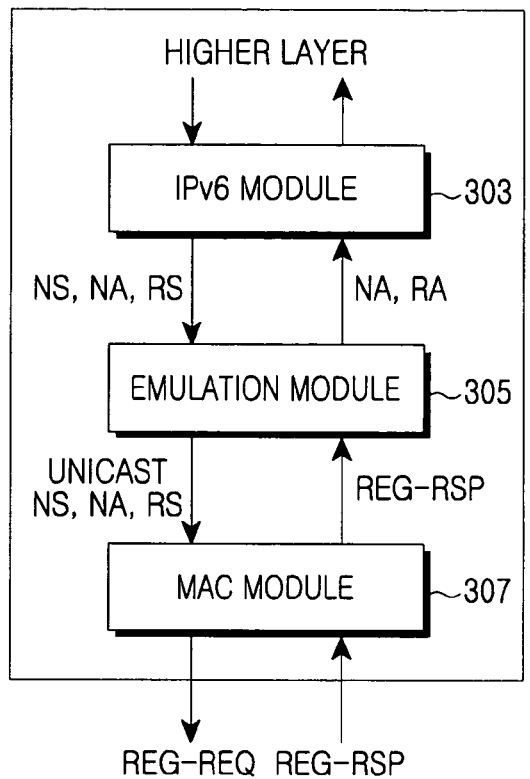
FIG. 3 illustrates the configuration of an IEEE 801.6 terminal according to an exemplary embodiment of the present invention.

FIG. 3 illustrates the configuration of an IEEE 801.6 terminal according to an exemplary embodiment of the present invention.

Referring to FIG. 3, the terminal includes an IPv6 module 303, MAC module 307, and network emulation module 305. The IPv6 module 303 outputs higher-layer data in the form of an IP packet and searches for a neighbor terminal or a router by the ND protocol. The MAC module 307 outputs the IP packet in the form of a MAC PDU and transmits a MAC management message for IPv6 communications. The network emulation module 305 collects network information from a response message received for a registration request message, generates a response message for a ND message created by the ND protocol when necessary, and provides the response message to the IPv6 module 303. The network emulation module 305 also converts a multicast ND message to a unicast message for transmission, and deletes the ND message when necessary.

Figure 4:
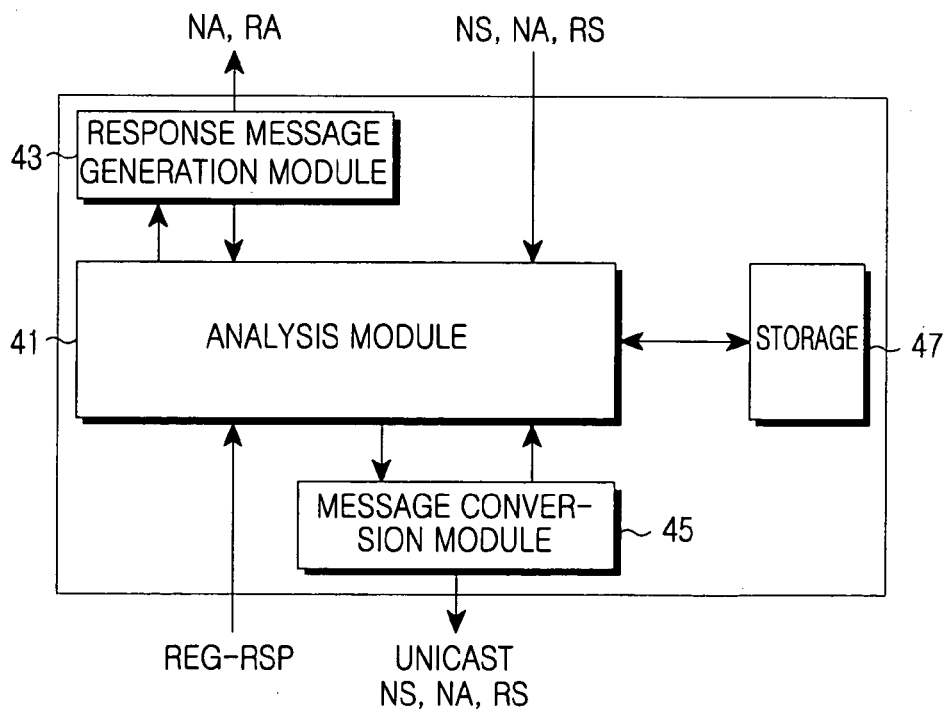
FIG. 4 illustrates the configuration of a network emulation module illustrated in FIG. 3.

FIG. 4 illustrates the configuration of the network emulation module illustrated in FIG. 3. Referring to FIG. 4, the network emulation module 305 includes an analysis module 41 for determining whether the collected network information contains information needed to generate a response message for the multicast ND message, a response message generation module 43 for, in the presence of the information for generation of the response message, generating the response message and providing the response message to the IPv6 module, and a message conversion module 45 for, in the absence of the information needed to generate the response message, converting the ND message to the unicast ND message and providing the unicast ND message to the MAC module. The network information is stored in a storage 47 and updated/managed by the analysis module 41.

Figure 5:
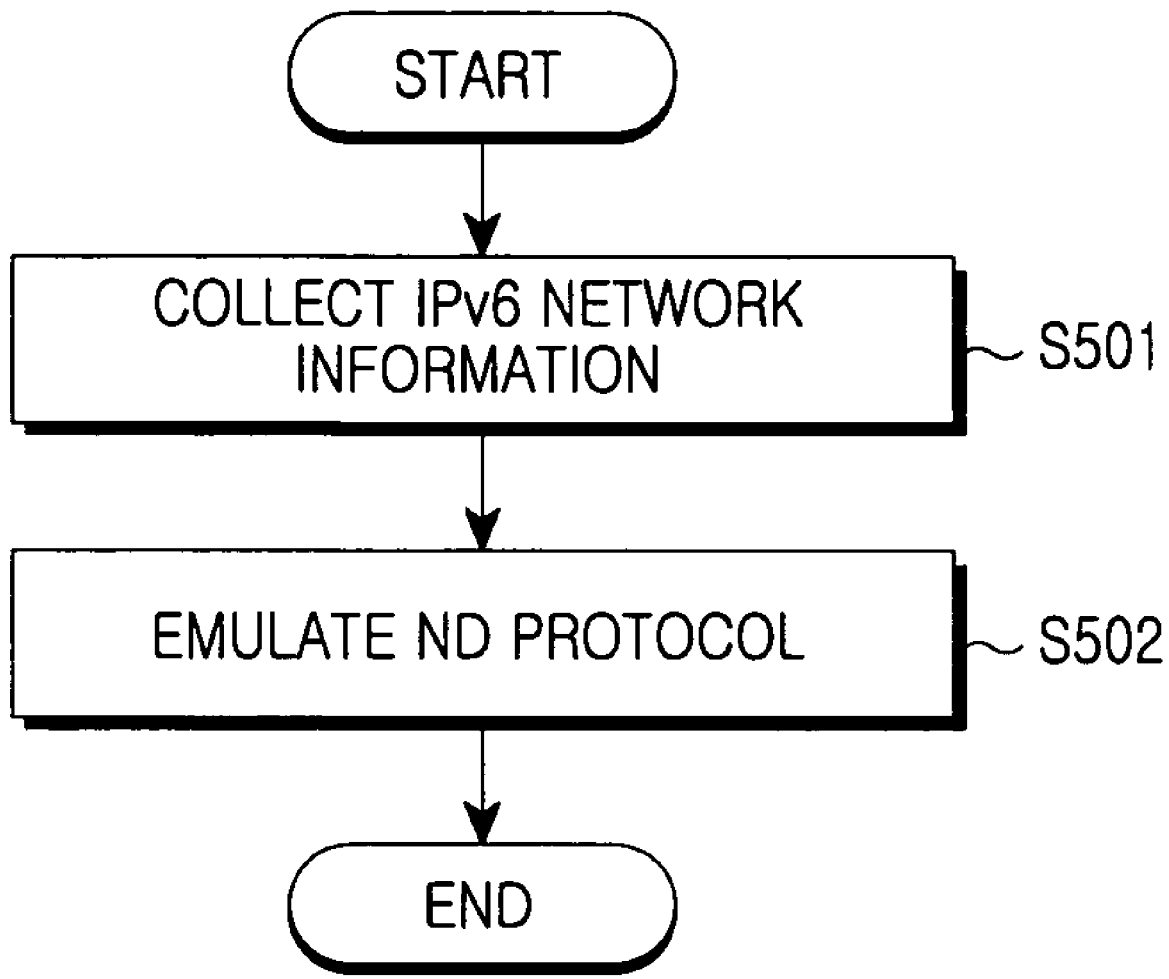
FIG. 5 is a flowchart illustrating an operation of the IPv6 network emulation module in the IEEE 802.16 system according to an exemplary embodiment of the present invention.

FIG. 5 is a flowchart illustrating an operation of the IPv6 network emulation module in the IEEE 802.16 system according to an exemplary embodiment of the present invention.

Referring to FIG. 5, when the terminal enters coverage of the BS and a communication link is completely established between the terminal and the BS, the terminal exchanges MAC management messages with the BS. During the message exchange, the network emulation module collects IPv6 network information from the MAC management message received from the BS in step S501 and emulates the ND mechanism of the IPv6 network based on the network information in step S502.

Figure 6:
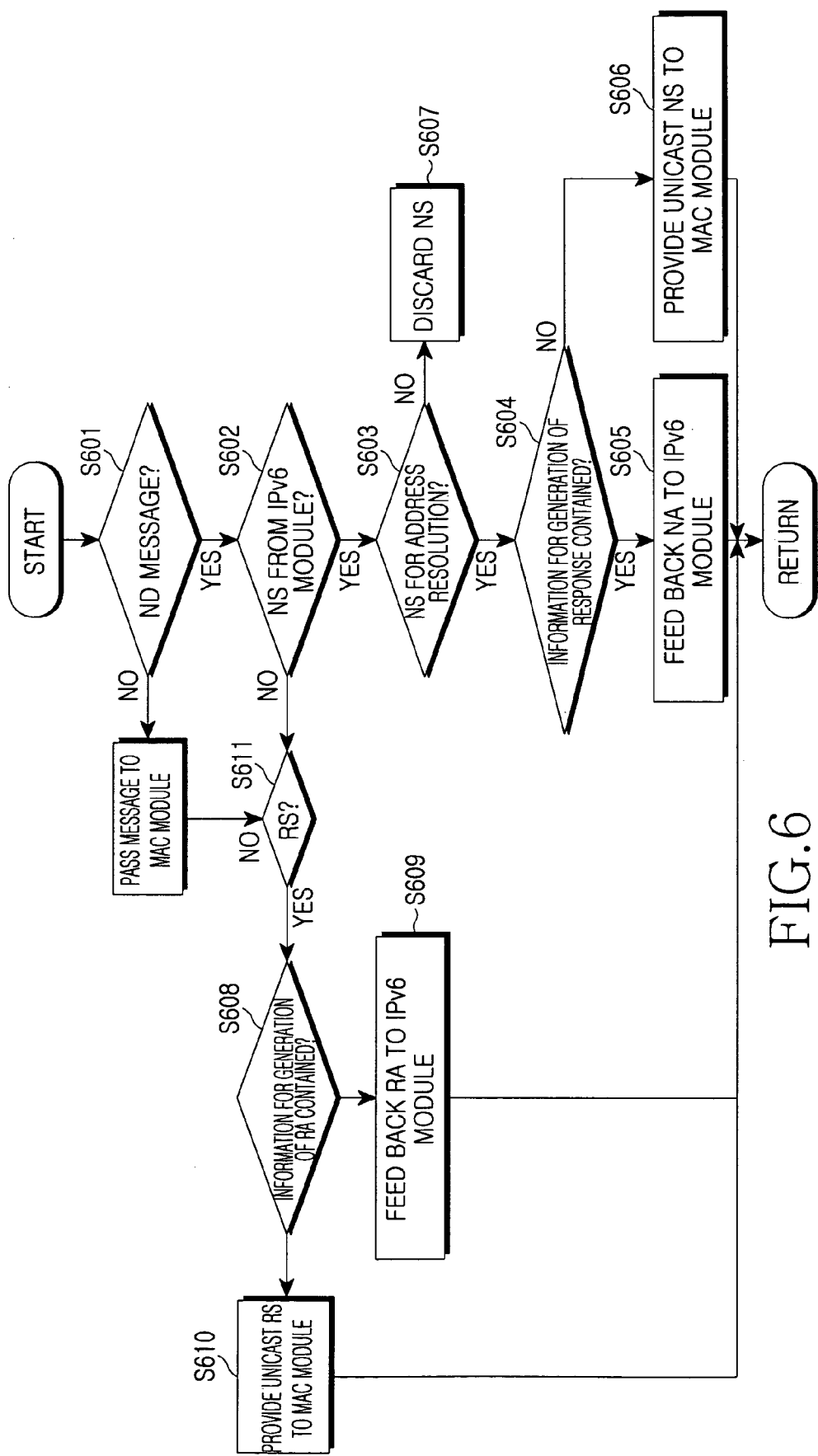
FIG. 6 is a detailed flowchart illustrating a network emulation operation described in FIG. 5.

FIG. 6 is a detailed flowchart illustrating the network emulation operation described in FIG. 5.

Referring to FIG. 6, the network emulation module passes messages other than messages generated by the ND protocol of the IPv6 layer to the MAC layer. Upon receipt of a ND message from the IPv6 module in step S601, the network emulation module determines whether the ND message is an NS message in step S602. In the case of an NS message, the network emulation module determines whether the NS message has been created for address resolution in step S603. If the NS message has been created for address resolution, the network emulation network determines whether the NS message contains information needed for generation of a response message in step S604. In the presence of the information, the network emulation module generates an NA message and feeds the NA message back to the IPv6 module in step S605. In the absence of the information, the network emulation module converts the NS message to a unicast NS message and provides the unicast NS message to the MAC module in step S606.

On the other hand, if the NS message has not been generated for address resolution, the network emulation module deletes the NS message, considering that the NS message has been generated for duplicate address detection in step S607.

If the ND message is not the NS message in step S602, the network emulation module determines whether the ND message is an RS message generated for router discovery in step S611. If the ND message is not the RS message, the network emulation module passes the ND message to the MAC module. In the case of the RS message, the network emulation module determines whether the RS message contains information needed for generation of a response message in step S608. In the presence of the information, the network emulation module generates an RA message and feeds the RA message back to the IPv6 module in step S609. In the absence of the information, the network emulation module converts the RS message to a unicast RS message and provides the unicast RS message to the MAC module in step S610.

As described above, in the IPv6 network emulation method in the IEEE 802.16 system according to exemplary embodiments of the present invention, a terminal creates an internal response message for a broadcast/multicast ND message generated by the ND protocol, deletes the ND message, or converts the ND message to a unicast ND message, based on network information included in a MAC management message received from a BS. Therefore, resources consumption for broadcasting/multicasting is minimized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A terminal of a wireless broadband communication system supporting Internet Protocol version 6 (IPv6) communications based on a neighbor discovery protocol, the terminal comprising:

an IPv6 module for generating a multicast neighbor discovery message to search for at least one of a neighbor terminal and a router; and a medium access control (MAC) module for exchanging MAC management messages with a base station for IPv6 communications, wherein a network emulation device is provided between the IPv6 module and the MAC module, and the network emulation device collects network information from a MAC management message received from the base station, the network emulation device determines whether the multicast neighbor discovery message has been created for address resolution, in response to the multicast neighbor discovery message being created for address resolution, the network emulation device determines, with an analysis module, whether the network information comprises information for generation of a response message for the multicast neighbor discovery message, in response to the network information comprising information for generation of the response message, the network emulation device generates, with a response message generation module, a response message for the multicast neighbor discovery message based on the network information and provides the response message to the IPv6 module, in response to the network information not comprising information for generation of the response message, the network emulation device converts, with a message conversion module, the multicast neighbor discovery message to a unicast neighbor discovery message and provides the unicast neighbor discovery message to the MAC module, and in response to the multicast neighbor discovery message not being created for address resolution, the network emulation device discards the multicast neighbor discovery message.

2. The terminal of claim 1, wherein the multicast neighbor discovery message comprises a neighbor solicitation message.

3. The terminal of claim 2, wherein the response message comprises a neighbor advertisement message comprising at least one of null and a MAC address.

4. The terminal of claim 1, wherein the multicast neighbor discovery message comprises a router solicitation message.

5. The terminal of claim 4, wherein the response message comprises a router advertisement message.

6. A method in a terminal of a wireless broadband communication system supporting Internet Protocol version 6 (IPv6) communications based on a neighbor discovery protocol, the method comprising:

generating, by an IPv6 module, a multicast neighbor discovery message to search for at least one of a neighbor terminal and a router;

exchanging, by a medium access control (MAC) module, MAC management messages with a base station for IPv6 communications;

collecting, by a network emulation device, for supporting the neighbor discovery protocol and disposed between the IPv6 module and the MAC module, network information from a MAC management message received from the base station; and emulating, by the network emulation device, the neighbor discovery protocol of the IPv6 module based on the network information, the emulating comprising:

the network emulation device determining whether the multicast neighbor discovery message has been created for address resolution, in response to the multicast neighbor discovery message being created for address resolution, the network emulation device determining whether the network information comprises information for generation of a response message for the multicast neighbor discovery message, in response to the network information comprising information for generation of the response message, the network emulation device generating a response message for the multicast neighbor discovery message based on the network information and providing the response message to the IPv6 module, in response to the network information not comprising information for generation of the response message, the network emulation device converting the multicast neighbor discovery message to a unicast neighbor discovery message and providing the unicast neighbor discovery message to the MAC module, and in response to the multicast neighbor discovery message not being created for address resolution, the network emulation device discarding the multicast neighbor discovery message.

7. The method of claim 6, wherein the emulating of the neighbor discovery protocol further comprises:

the network emulation device determining, upon receipt of the multicast neighbor discovery message from the IPv6 module, whether the multicast neighbor discovery message is a neighbor solicitation message; and if the network emulation device generates a response message, the response message being a neighbor advertisement message; and if the network emulation device converts the multicast neighbor discovery message to a unicast neighbor discovery message, the unicast neighbor discovery message being a unicast neighbor solicitation message.

8. The method of claim 7, wherein the emulating of the neighbor discovery protocol further comprises:

the network emulation device determining whether the multicast neighbor discovery message is a router solicitation message generated for router discovery if the multicast neighbor discovery message is not the neighbor solicitation message; and if the network emulation device generates a response message, the response message being a router advertisement message; and if the network emulation device converts the multicast neighbor discovery message to a unicast neighbor discovery message, the unicast neighbor discovery message being a unicast router solicitation message.

* * * * *